US006122001A

United States Patent [19]

Micaletti et al.

[11] Patent Number: 6,122,001

[45] Date of Patent: Sep. 19, 2000

[54] IMAGE ACQUISITION SYSTEM FOR SORTING PACKETS

[75] Inventors: Gilbert Micaletti, Pomponne; Claude Mitte, Montigny les Cormeilles, both of France

[73] Assignee: Alcatel Postal Automation Systems, Cedex, France

[21] Appl. No.: 08/821,924

[22] Filed: Mar. 21, 1997

[30] Foreign Application Priority Data

Mar. 22, 1996 [FR] France ........................ 96 03606

[51] Int. Cl.[7] ........................ H04N 7/18

[52] U.S. Cl. ........................ 348/91; 348/94

[58] Field of Search ........................ 348/61, 86, 88, 348/91, 92, 94, 95, 295; 235/454, 472; 382/108, 141; H04N 7/18

[56] References Cited

U.S. PATENT DOCUMENTS 4,700,427 10/1987 Knepper ........................ 180/169
4,920,255 4/1990 Gabeler .
5,184,733 2/1993 Arnarson et al. ........................ 348/91
5,440,648 8/1995 Roberts et al. ........................ 382/141
5,650,813 7/1997 Gilblom et al. ........................ 348/295
5,668,887 9/1997 Parket et al. ........................ 382/141
5,696,591 12/1997 Bilhorn et al. ........................ 348/88
5,729,473 3/1998 Blanc et al. ........................ 348/91

FOREIGN PATENT DOCUMENTS

0620051A1 10/1994 European Pat. Off. .
0647479A2 4/1995 European Pat. Off. .
3736288A1 5/1989 Germany .

*Primary Examiner*—Richard Lee
*Attorney, Agent, or Firm*—Sughrue, Mion, Zinn, Macpeak & Seas, PLLC

[57] ABSTRACT

The system comprises a high resolution camera (1) mounted above a conveyor plane (4) along which objects are displaced, thereby enabling the top face of each object to be observed. The camera (1) is fitted with an objective lens system (5) having a motor-driven focusing system that operates in association with a pickup (8) that produces a signal (S) representative of the vertical profile of the top face of each object relative to the conveyor plane. The profile signal serves to produce positioning references (C) for the focusing mechanism in order to take account of variations in the height of the top face of each object while that object is moving beneath the objective lens system of the camera. Such an image acquisition system is employed to read addresses automatically from postal packets for the purpose of performing automatic sorting.

12 Claims, 1 Drawing Sheet

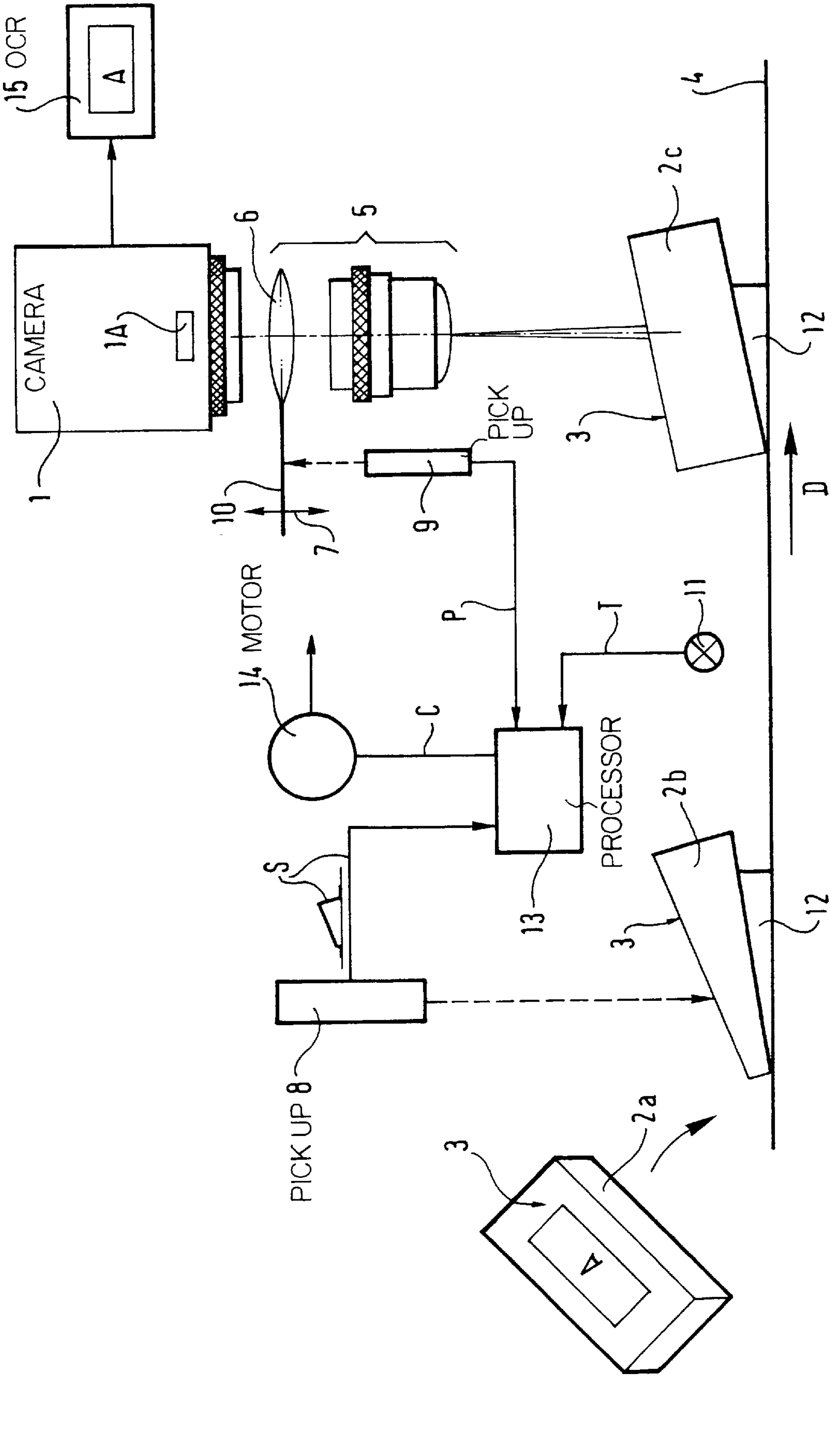
CAMERA
1A
1
15 OCR
A
6
5
2c
4
12
3
PICK UP
9
10
7
D
14 MOTOR
P
T
11
C
PROCESSOR
13
2b
S
PICK UP 8
2a

IMAGE ACQUISITION SYSTEM FOR SORTING PACKETS

BACKGROUND OF THE INVENTION

1. Field of Invention

The invention relates to an image acquisition system for reading information on the top faces of objects being displaced on a conveyor, the system comprising a high resolution camera mounted in a fixed position above the plane of the conveyor to read the top face of each object, said camera being fixed and having a lens system with a motor-driven focusing mechanism.

2. Description of the Related Art

Such a system is already known from document EP-0647479. It is intended more particularly for automatically reading the destination addresses of postal packets or parcels by performing optical character recognition on the basis of the images and for the purpose of performing automatic postal sorting. In that system, an ultrasound pickup determines the height of the plane corresponding to the top surface of each parcel or packet relative to the plane of the conveyor so as to control the motor of the focusing mechanism when the camera begins to observe the top surface of the object.

In that known system, the camera is of the type having photosensitive elements of the charge-coupled device (CCD) type and its depth of field (for a fixed distance between the array of photosensitive elements and the object being observed) depends on two parameters: the magnification factor and the aperture of the lens system. In practice, the magnification factor (ratio of the dimensions between the observed object and its image) is around 9 to 13 for objects such as postal parcels or packets. Also, the aperture of the lens system is limited, given the speed at which postal parcels or packets are conveyed in sorting equipment (about 1 meter per second (m/s) to 2 m/s) and the light energy required for illuminating the parcels or packets while an image is being acquired (2 kW is a maximum). An aperture of 2 seems to be a limit that is difficult to improve, and consequently the maximum depth of field that can be obtained is of the order of 2 cm to 3 cm.

With those constraints, that image acquisition system cannot operate properly when some or all of the parcels or packets have top faces presenting large surface irregularities (corrugations, steps) giving rise to variations in the height of the top face of any one parcel or packet that are significantly greater than the depth of field of the lens system, consequently making it impossible to obtain a sharp image of the information. Also, it is not possible to envisage processing articles of mail disposed in an inclined manner on the plane of the conveyor. Unfortunately, this practice is commonplace since it serves to keep bulky articles of mail such as parcels or packets in a fixed position on a conveyor belt when the belt is moved at high speed (of the order of 1 m/s to 2 m/s).

SUMMARY OF THE INVENTION

The object of the invention is to propose an image acquisition system that is improved over that known in the past.

In particular, the idea is to propose an image acquisition system capable of adapting in real time to variations in the height of the top face of a parcel or a packet that can be much greater than the depth of field (depth of field fixed a priori) of the lens system of a high resolution camera (typically, variations of about 40 cm as compared with a lens system having a depth of field of 2 cm) while the parcels or packets are travelling at about 1.7 m/s.

To this end, the invention provides an image acquisition system comprising a pickup adapted to produce a signal representative of the vertical profile of the top face of each object relative to the conveyor plane, and means are provided to process the profile signal so as to produce positioning references for the focusing mechanism that serve to take account of variations in the height of the top face of each object while the object is moving beneath the lens system of the camera.

The pickup is preferably a laser telemeter which presents the advantage of having a good response on surfaces of different colors, which is advantageous in a postal application.

In an advantageous embodiment of the invention, another laser telemeter is also provided to produce a signal indicative of the position of a moving lens disposed behind the lens system and moved by a DC motor of the focusing mechanism. The position signal serves to solar control the positioning references so as to increase the accuracy with which focusing is adjusted.

The camera may be a camera having photosensitive elements that are charge-coupled devices (CCD), or time and delay integration (TDI) devices. In the second case, it is possible to reduce either the lighting power required for acquiring an image, or else to reduce the diaphragm of the camera, thereby increasing the depth of field by a few centimeters, thus making it possible to reduce the number of adjustments that need to be performed in real time for focusing purposes.

BRIEF DESCRIPTION OF THE DRAWING

An embodiment of the invention is described below in detail with reference to the sole FIGURE which is a general overall diagram of an acquisition system of the invention.

DETAILED DESCRIPTION OF PREFERRED EMBODIMENT

The image acquisition system described below is intended to be connected to an optical character recognition system 15 for automatically reading the addresses on mail articles such as parcels or packets, however the invention is not limited to this particular field of application.

In the FIGURE, the image acquisition system comprises a camera 1 mounted stationary on a frame (not shown) above a conveyor plane on which postal packets 2*a*, 2*b*, 2*c* are moved, said packets having postal address information on their top faces 3, as represented by A for the packet 2*a*. It should be observed that this information may be printed on a label stuck to the top face of each packet as is shown for packet 2*a*.

The packets are moved at high speed along the conveyor plane 4 in a direction D so that they pass beneath the camera 1.

The camera 1 is placed about 2 meters (m) above the plane of the conveyor. The lens system 5 of the camera is fitted with a motor-driven focusing mechanism (not shown in the FIGURE) which moves a moving back lens 6 in a direction perpendicular to the plane of the conveyor, as represented by double-headed arrow 7, to perform focusing by moving the zone of sharpness.

The camera 1 is a high resolution line scanning camera of the type having an array of photosensitive elements 1A of the charge-coupled device type or of the integration type disposed transversely to the direction D so as to cover the entire width of the plane of the conveyor. In the FIGURE, the device for lighting the packets for the purpose of image acquisition is not shown.

A first laser telemeter 8, e.g. an "M5L/400" model having an excursion capacity of about 40 cm, is placed above the plane of the conveyor upstream from the camera 1 in the direction D. This telemeter 8 delivers a fine light beam at a high frequency onto the top face of each packet, and it outputs a signal S representative of the vertical profile of said face relative to the plane of the conveyor.

Another laser telemeter 9, e.g. a "M5L/4" model having an excursion capacity of about 4 mm, is mounted stationary relative to the lens system 5 and serves to determine the position of a reference target 10 secured to the moving lens 6.

A sensor 11 of the photocell type is disposed upstream from the camera 1 in the direction D and downstream from the telemeter 8. This sensor serves to detect when the leading edge of a packet goes past so as to synchronize the transmission of reference commands to the motor of the focusing mechanism with the displacement of the packets. The motor is preferably a DC motor enabling accurate displacement of the moving lens to be obtained (to within about 10 microns).

As shown in the FIGURE, the objects 2*b* and 2*c* are displaced on the plane of the conveyor while they are inclined by virtue of being placed on wedge-shaped supports 12. In this position, the height of the top face of each packet relative to the plane of the conveyor varies over a range that is larger than the depth of field of the objective lens system. It is therefore necessary to perform successive focusing operations so as to move the zone of sharpness to cause it to track the vertical profile of the top face of a packet as said packet moves beneath the objective lens system of the camera. An embodiment of the image acquisition system has been built and tested. It was capable of processing packets moving at a speed of 1.7 m/s with a focusing time for the lens system of less than 100 ms for a 40 cm excursion of the zone of sharpness.

The general operation of the above system is as follows.

As a packet such as 2*b* passes beneath the laser telemeter 8, the telemeter produces an output analog signal S representative of the vertical profile of the top face 3 of said packet. This signal is digitized at a sampling frequency that is selected to obtain about 300 measurement points for a packet having a length of about 40 cm. The measurement points (succession of different heights along the top face in the direction D) are processed in real time by the processor 13 making use of a table that causes vertical profile heights to correspond with reference data, itself corresponding to as many adjustment positions for the moving lens 6 and thus positions for the zone of sharpness. The packet 2*b* moves along the direction D towards the camera 1 and is detected by the sensor 11 which then applies a detection signal T to the processor 13. On receiving the signal T, the processor 13 sends a reference data succession C to the motor 14 at a frequency which is a function of the travel speed of the packet 2*b* beneath the objective lens system of the camera, and after a guard time that depends on the distance between the sensor 11 and the optical axis of the camera 1. In response to receiving reference data, the motor 14 moves the moving lens 6 to the desired position for obtaining the required focusing. The position signal P produced by the telemeter 9 is also applied to the processor 13 so as to servo-control the reference data applied to the motor 14.

In the image acquisition system of the invention, only one lens is moved for focusing purposes, thereby making it possible to perform focusing very quickly and giving rise to a system that is highly reliable.

What is claimed is:

1. An image acquisition system for reading information formed on top surfaces of a plurality of objects, said plurality of objects being displaced along a conveyor plane, the system comprising:

a high resolution camera that is mounted above the conveyor plane to observe the top surface of each of said plurality of objects, the camera including an objective lens system having a motor-driven focusing mechanism;

a pickup mounted above the conveyor plane to determine a vertical profile of the top surface of each single object relative to the conveyor plane, and to produce a profile signal representative of the vertical profile of the top surface of each object relative to the conveyor plane; and a means for processing said profile signal output by the pickup to produce a positioning reference signal for the focusing mechanism wherein the positioning reference signal takes into account variations in the vertical profile of the top surface of the single object as said each single object moves beneath the lens system of the camera to adjust the focusing mechanism according to the variations in the vertical profile of said each single object.

2. The system according to claim 1, wherein the pickup is a laser telemeter.

3. The system according to claim 1, further including:

a moving lens disposed behind the objective lens system; and a second pickup to produce a lens position signal corresponding to a position of [a] the moving lens relative to the objective lens system, the moving lens being moved by a motor of the focusing mechanism in accordance with said lens position signal and said positioning reference signal to adjust a zone of sharpness of the objective lens system according to the variations in the vertical profile of said each single object.

4. The system according to claim 3, wherein said second pickup is a laser telemeter.

5. The system according to claim 3, wherein the motor-driven focusing mechanism is fitted with a DC motor.

6. The system according to claim 1, wherein the camera is a camera having photosensitive elements in the form of a charge-coupled device (CCD).

7. The system according to claim 1, wherein the camera is a camera having photosensitive elements in the form of a time and delay integration (TDI) device.

8. The image acquisition system according to claim 1 further including an optical character recognition device to scan information produced by the camera.

9. The system according to claim 1, wherein the profile signal includes data corresponding to steps and irregularities occurring in the top surface of said each single object.

10. The system according to claim 9, further including:

a moving lens disposed behind the objective lens system; and a second pickup to produce a lens position signal corresponding to a position of the moving lens relative to the objective lens system, the moving lens being moved by a motor of the focusing mechanism in accordance with said lens position signal and said positioning reference signal to adjust a zone of sharpness of the objective lens system.

11. The system according to claim 1, wherein the profile signal includes multiple samples of height from the top surface of said each single object.

12. The system according to claim 11, further including a moving lens disposed behind the objective lens system; and a second pickup to produce a lens position signal corresponding to a position of the moving lens relative to the objective lens system, the moving lens being moved by a motor of the focusing mechanism in accordance with said lens position signal and said positioning reference signal to adjust a zone of sharpness of the objective lens system.

* * * * *